United States Patent
Lee et al.

(10) Patent No.: US 7,628,006 B2
(45) Date of Patent: Dec. 8, 2009

(54) THRUST TERMINATION DEVICE FOR SOLID ROCKET MOTOR

(75) Inventors: Hwan-Gyu Lee, Seongdong-gu (KR); Shin-Hoe Kim, Seo-gu (KR); Hong-Been Chang, Seo-gu (KR); Moon-Joong Kang, Seo-gu (KR)

(73) Assignee: Agency For Defense Development (KR)

( * ) Notice: Subject to any disclaimer, the term of this patent is extended or adjusted under 35 U.S.C. 154(b) by 491 days.

(21) Appl. No.: 11/590,927

(22) Filed: Nov. 1, 2006

(65) Prior Publication Data

US 2007/0137176 A1      Jun. 21, 2007

(30) Foreign Application Priority Data

Nov. 2, 2005    (KR) ...................... 10-2005-0104059

(51) Int. Cl.
*F02K 9/08*    (2006.01)
(52) U.S. Cl. ........................ 60/229; 60/254; 239/265.25
(58) Field of Classification Search .................. 60/229, 60/233, 234, 253, 254; 89/1.812; 102/381; 239/265.25, 265.27
See application file for complete search history.

(56) References Cited

U.S. PATENT DOCUMENTS

| | | | |
|---|---|---|---|
| 3,052,091 A | | 9/1962 | O'ooge |
| 3,134,222 A | * | 5/1964 | Maxson ...................... 60/254 |
| 3,177,655 A | | 4/1965 | White |
| 3,185,096 A | * | 5/1965 | Daudelin ..................... 102/377 |
| 3,196,610 A | | 7/1965 | Anderson |
| 3,442,083 A | | 5/1969 | Klotz |
| 4,171,663 A | | 10/1979 | Day et al. |
| 4,484,439 A | | 11/1984 | Singer et al. |
| 4,625,649 A | | 12/1986 | Russell |
| 5,400,713 A | | 3/1995 | Humiston et al. |

* cited by examiner

*Primary Examiner*—Louis J Casaregola
(74) *Attorney, Agent, or Firm*—Banner & Witcoff, Ltd.

(57) ABSTRACT

Disclosed is an abrupt opening apparatus of a pressurized chamber in an intended procedure to accomplish thrust termination for a stage separation of the solid rocket motor. It can open trust termination ports with simple mechanical structure to thereby terminate the normal thrust of a nozzle reliably, if it is intended to terminate the normal thrust produced from the nozzle of the rocket motor to thereby impede the forward movement of the rocket motor by producing the reverse thrust. The thrust termination device for the rocket motor comprises a closure 210 for closing the thrust termination ports in an air-tight structure; a snap ring 220 for supporting the closure 210; a wedge 230 arranged between both free ends of the snap ring; a wedge fixing plate 240 for fixing the wedge; and, a pulling wire 250 linked to the wedge at one end thereof for extracting the wedge by being drawn when the thrust termination is performed.

2 Claims, 2 Drawing Sheets

THRUST TERMINATION DEVICE FOR SOLID ROCKET MOTOR

BACKGROUND OF THE INVENTION

1. Field of the Invention

The present invention relates to an abrupt opening apparatus of a pressurized chamber in an intended procedure to accomplish thrust termination of the solid rocket motor.

2. Background of the Related Art

In general, the solid rocket motor comprises a combustion chamber which contains the propellant initially, and a nozzle for generating propulsion by accelerating the gas produced from the combustion in the chamber. In this regard, if the gas is accelerated in the nozzle, thrust is produced in the direction opposing to the accelerated direction of the gas by means of the retroaction to thereby propel the flight vehicle.

The thrust control of a solid rocket motor is very difficult in comparison to a liquid rocket engine. Thrust termination by abrupt opening of ports formed at the front of a combustion chamber during the combustion is one of the thrust controls of solid rocket motor.

When the rocket motor provided with the thrust termination device as described above is schematically reviewed, it comprises a combustion chamber with a solid propellant built-in; a nozzle mounted at the rear of the combustion chamber; a dome formed at the front side of the combustion chamber; an igniting device mounted at the center of the dome; and a plurality of thrust termination devices mounted at the dome of the combustion chamber.

During the combustion the thrust termination port undergoes combustion pressure and is maintained to be closed by the thrust termination device. When the command of thrust termination is practiced, the thrust termination ports are opened and the ports act like as other nozzles for a time, then combustion is broke up as the pressure of the combustion chamber drops radically.

Conventionally, a Pyrotechnic devices (explosion bolt) described in U.S. Pat. No. 5,400,713 are mostly used in the thrust termination device.

In this regard, it is required for the thrust termination device to be sufficiently safe in structure before the operation, operated rapidly at the operation and reproduced completely. However, when the thrust termination device such as the pyrotechnic device was operated, there were produced substantially big impacts, and fragments of the operated device were dispersed, so that the missile had to be affected from the substantial impact during the operation of the thrust termination device to thereby affect badly to the flying stability of the missile and the precision of the control after the thrust termination.

Accordingly, it is very important to reduce the magnitude of impacts at the time of the operation of the thrust termination device.

SUMMARY OF THE INVENTION

For the flight of a multi-stage solid rocket missile, the thrust termination is needed to cut off thrust and separate a lower stage rocket from an upper stage vehicle. The thrust termination device of the present invention is an abrupt opening equipment of a pressurized chamber and it has advantages of applicability and simplicity above the prior arts.

The thrust termination device for a solid rocket motor must have the structural stability at the high pressure and high temperature, and maintain the air-tight state in relation to the thrust termination port until the thrust termination command performed during the combustion. But, when the stage separation command is performed, the ports located at the forward side of the combustion chamber must be opened and would act as other nozzles.

To accomplish the above objects, according to the present invention, there is provided a thrust termination device 200 for a rocket motor, which is constructed to close a plurality of thrust termination ports 132 formed at a dome 130 of the combustion chamber mounted at the rocket motor, and to open them when a command of thrust termination is performed. The thrust termination device 200 is characterized by comprising a closure 210 to close port in an air-tight structure; a snap ring to withstand the closure expulsion force which is produced by combustion pressure; a wedge 230 mounted between both free ends of the snap ring to restrict radial contraction of snap ring; a wedge fixing plate 240, and a pulling wire 250 bound to the wedge at one end thereof for the wedge 230 expulsion by being drawn, when the thrust termination is performed.

According to the present invention, a spline groove 136 is formed at an inner peripheral surface of the thrust termination port corresponding to a portion between both free ends of the snap ring 220 and the wedge 230 is inserted into the spline groove 136.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiment of the present invention with reference to the attached drawings. Prior to the detailed description of the present invention, it should be confirmed that the terms or words used in the specification and claims of the present invention are construed as meanings and concepts conforming to the technical spirit of the present invention on the basis of a principle that the inventors can define the concept of the term properly for explain their invention with the best method.

Figure 1:
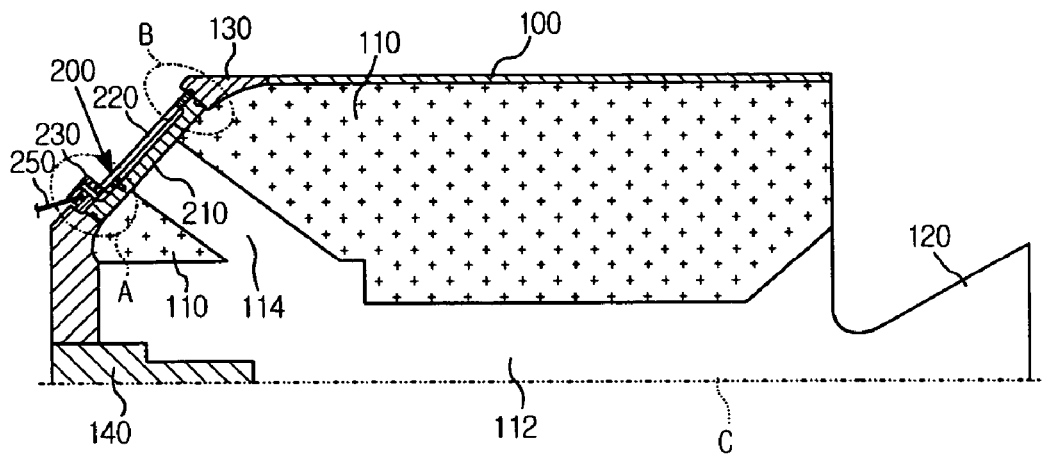
FIG. 1 is a cross-sectional view for showing an example of a rocket motor applied of a thrust termination device of the present invention.

In FIG. 1, an example of a rocket motor to which a thrust termination device of the present invention is applied, is shown. As shown in the drawing, the rocket motor applied of the thrust termination device 200 of the present invention, comprises a combustion chamber 100 with a solid propellant 110 built-in; a nozzle 120 mounted at the rear of the combustion chamber 100; a dome 130 mounted at the forward end of the combustion chamber 100; an ignition device 140 mounted at the center of the dome of the combustion chamber 100; and a plurality of thrust termination devices 200 mounted at the dome 130 of the combustion chamber 100 in a symmetrical structure with respect to the center axis C of the rocket motor;

a closure 210; a snap ring 220; a wedge 230; a pulling wire 250; and a free space of combustion chamber 112, 114 where the burning is therein.

Figure 2:
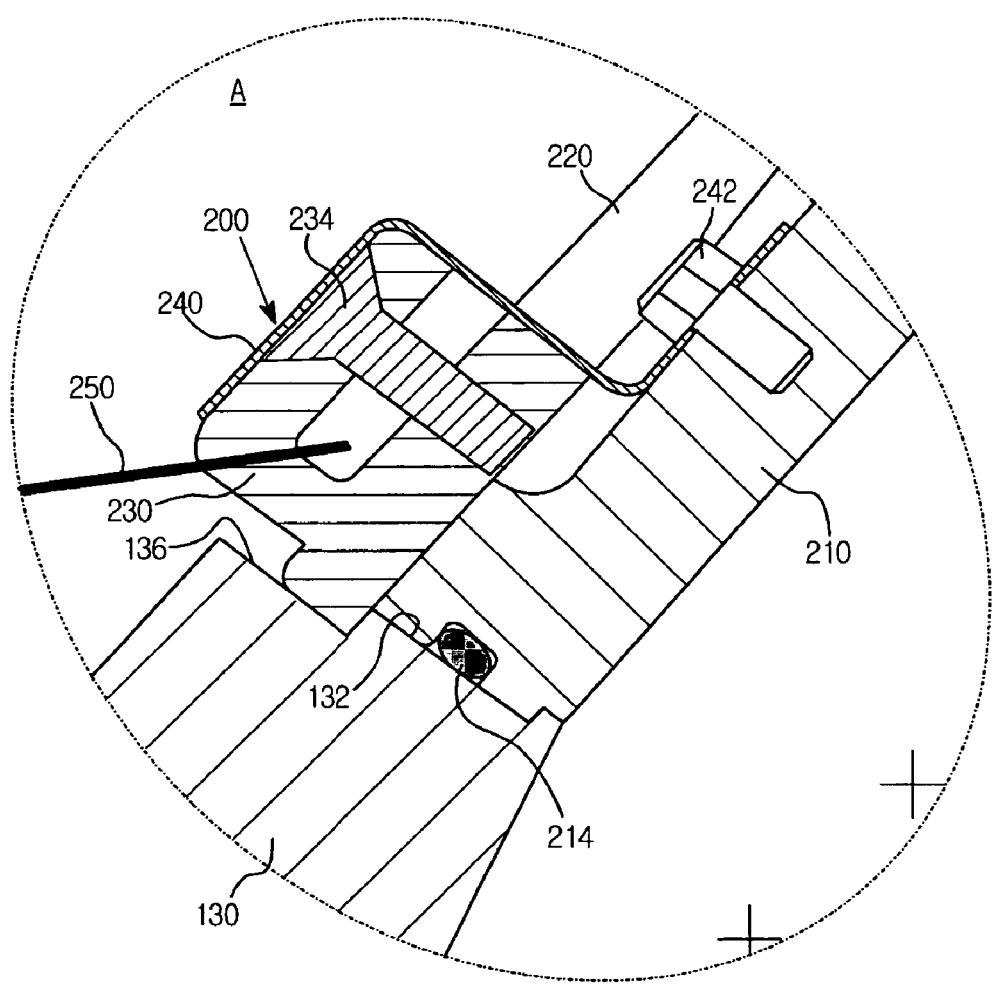
FIG. 2 is an enlarged view of "A" portion in FIG. 1.
Figure 3:
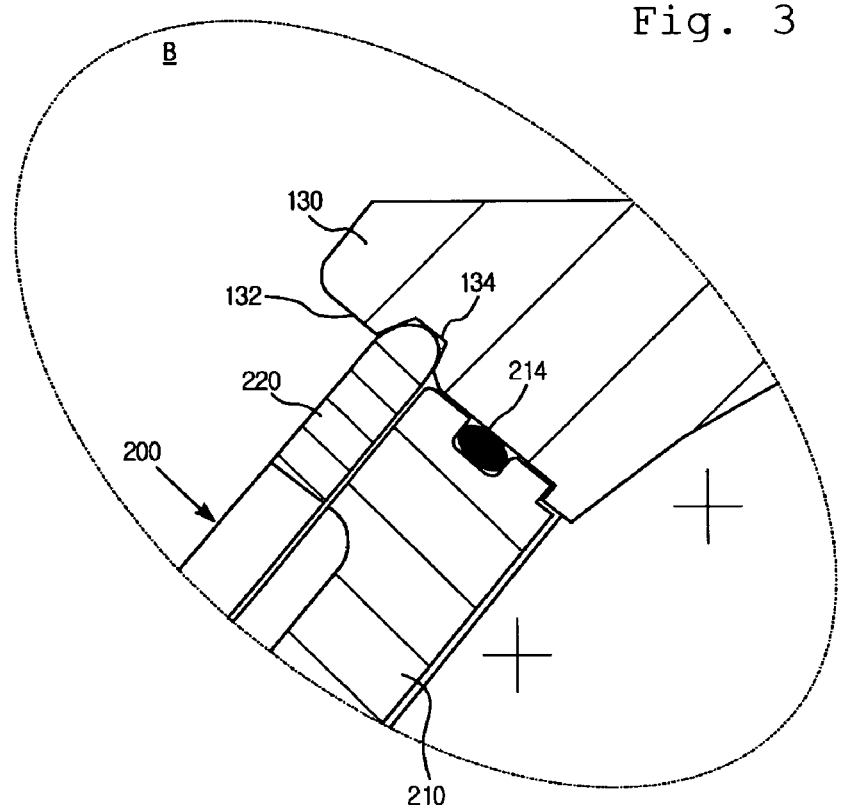
FIG. 3 is an enlarged view of "B" portion in FIG. 1.

FIG. 2 and FIG. 3 are the enlarged view of the FIG. 1 A and B respectively. The thrust termination port 132 is closed by the closure 210 with O-ring seal 214, a snap ring 220 which has slanted shape to leave a snap ring groove 134 easy is installed in a snap ring groove 134 and restricts closure 210, and a wedge 230 is positioned between the free ends of the snap ring 220 and spline groove 136 coincidentally (see FIG. 4). The spline groove 136 is an opened portion of the snap ring groove 134 to avoid a disturbance of the wedge extraction by pulling wire 250. A pulling wire 250 extracts a wedge 230 by extraction force. This force is not mentioned in this document but generally it is the piston force generated by chamber pressure. Furthermore, one end of the pulling wire is linked with the wedge 230 and a securing screw 234 is installed to prevent a pulling wire being separated from the wedge. A wedge fixing plate 240 fixes the wedge 230 to the closure 210 from a certain unintentional impact by means of a bolt 242. When the pulling wire 250 extracts the wedge 230 the wedge fixing plate 240 must be deformed for easy extraction of the wedge 230.

Figure 4:
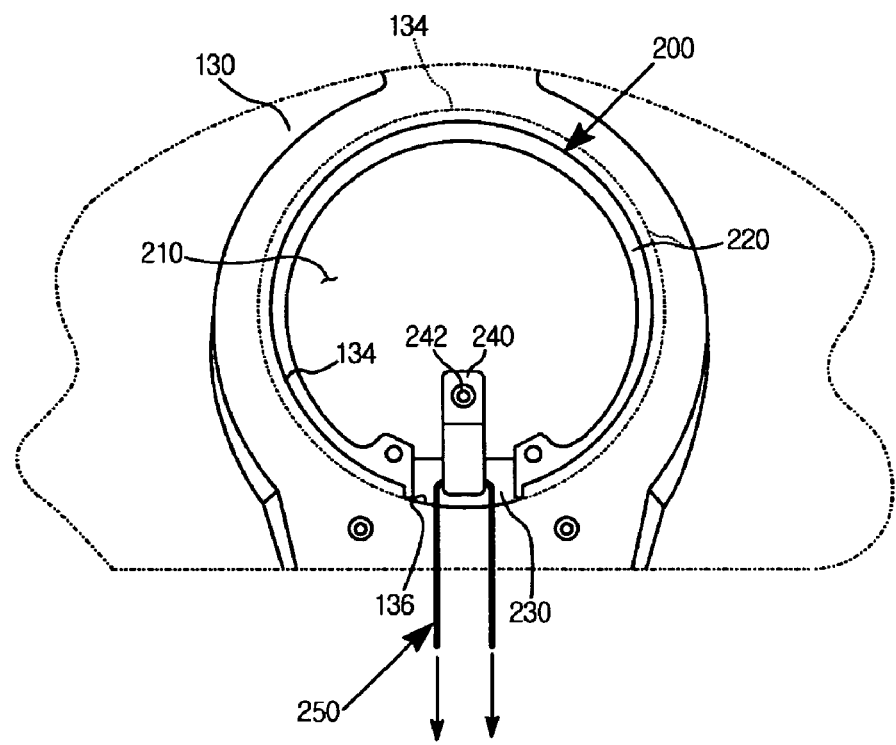
FIG. 4 is a partial front view for showing a rocket motor applied of the thrust termination device according to the present invention.

FIG. 4 is the front view of the thrust termination device of the present invention.

The thrust termination device 200 according to the present invention is constructed of a mechanical structure that the thrust termination ports 132 formed at the dome 130 of the combustion chamber 100 are closed in a high pressure (generally several thousands psi) and a high temperature at the normal thrust state, and opened abruptly when the command of thrust termination is practiced. The thrust termination ports 132 are designed symmetrically and preferable to have inclination angles about 45° with respect to the center axis C of the solid rocket motor that the upper stage may not be damaged when it is opened. Furthermore, the passage 114 passes through the free space of the combustion chamber 112.

Next, the operation of the thrust termination device for the solid rocket motor according to the present invention will be described.

In the present invention, thrust termination devices 200 are parts of the combustion chamber 100 in a normal thrust state. It means the thrust termination devices 200 should endure high pressure and high temperature conditions. When the thrust termination is needed, the pulling wire 250 is pulled by a certain mechanism, then the wedge is extracted as it deforms the wedge fixing plate 240, then the snap ring 220 and the closure 210 are expelled as the snap-ring contract in radial direction by the closure expelling force from the combustion chamber. So, the reverse thrusts are added to a normal thrust for a time and then the thrust is terminated. With the process aforementioned, the stage separation of the multi-stage missile is performed.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A thrust termination device for a solid rocket motor which is constructed of thrust termination ports formed at a dome of a combustion chamber, the ports being closed at a normal thrust state, and opened abruptly when the command of thrust termination is practiced, wherein the thrust termination device comprises: a closure corresponding to each termination port, each closure supported by the thrust termination port to close the port in an air-tight structure; a snap ring having an outer edge engaged with a groove formed at an inner peripheral surface of the thrust termination port at the front of the closure for supporting the closure; a wedge mounted between both free ends of the snap ring and groove of the port coincidentally; a wedge fixing plate for fixing the wedge onto the closure; and a pulling wire linked to the wedge for separating the wedge by being drawn.

2. The thrust termination device for a rocket motor according to claim 1, wherein the groove is formed at an inner peripheral surface of the thrust termination port to help extraction of the wedge.

\* \* \* \* \*